United States Patent
Christofilos

[15] 3,664,921
[45] May 23, 1972

[54] PROTON E-LAYER ASTRON FOR PRODUCING CONTROLLED FUSION REACTIONS

[72] Inventor: Nicholas C. Christofilos, Hayward, Calif.

[73] Assignee: The United States of America as represented by the United States Atomic Energy Commission

[22] Filed: Oct. 16, 1969

[21] Appl. No.: 868,287

[52] U.S. Cl..................................176/4, 313/161, 176/5, 315/111
[51] Int. Cl. ......................................................G21b 1/00
[58] Field of Search..............................176/1–10

[56] References Cited

UNITED STATES PATENTS

| | | |
|---|---|---|
| 3,036,963 | 5/1962 | Christofilos..............................176/4 |
| 3,039,014 | 6/1962 | Chang........................................176/4 |
| 3,071,525 | 1/1963 | Christofilos..............................176/4 |
| 3,485,716 | 12/1969 | Bodner......................................176/4 |

*Primary Examiner*—Reuben Epstein
*Attorney*—Roland A. Anderson

[57] ABSTRACT

High energy charged particles (molecular ions) are injected and trapped in a linear axial magnetic mirror containment field to produce a cylindrical E-layer of relativistic ions, e.g., protons rotating about the axis of said field. The magnetic field of said E-layer interacts with the mirror field to produce a pattern of closed magnetic field lines defining a charged particle containment zone into which neutral fuel materials may be introduced to be ionized by interaction with the E-layer particles forming a high temperature gas or plasma therein.

11 Claims, 3 Drawing Figures

INVENTOR.
NICHOLAS C. CHRISTOFILOS

INVENTOR.
NICHOLAS C. CHRISTOFILOS
BY

PROTON E-LAYER ASTRON FOR PRODUCING CONTROLLED FUSION REACTIONS

BACKGROUND OF THE INVENTION

This invention was made under or in the course of Contract W-7405—48 with the United States Atomic Energy Commission.

Devices employed and proposed heretofore for the provision and containment of high temperature gases or plasmas utilize magnetic fields of a diversity of configurations. One class of such devices is represented by the Astron such as that disclosed in my U.S. Pat. No. 3,071,525, issued Jan. 1, 1963, entitled "Method and Apparatus for Producing Thermonuclear Reactions." In the aforesaid "Astron," an elongated axially symmetric magnetic field is established in an evacuated vessel. Such field includes terminal regions of increased magnetic field intensity constituting magnetic mirror closure fields. Relativistic electrons are injected and trapped, e.g., by a method involving localized manipulations of magnetic fields or by another procedure as described in my U.S. Pat. No. 3,036,963, issued May 29, 1962, to form a cylindrical sheath or E-layer of realtivistic electrons rotating about the axis between the mirror portions of said magnetic field. Thereafter thermonuclear fuel material is introduced into the magnetic field to be ionized and heated by collisional interaction with the electrons of the E-layer. The heated ions formed in this manner are trapped and contained in the closed system of magnetic field lines or containment zone provided by interaction of the external field with that of the E-layer.

The Astron system has certain inherent advantages. For example, the E-layer exerts a strong stabilizing influence against the occurrence of instabilities which have created difficulties in other systems. There exists, however, a need for other procedures for introducing particles and fuels into Astron type containment fields as well as for other operating procedures to utilize to full advantage the versatility of the basic Astron concept.

SUMMARY OF THE INVENTION

This invention relates, in general, to the production of high temperature gases or plasmas and, more particularly, to devices and methods for producing high temperature gases and plasmas utilizing containment zones defined by a magnetic field produced by the interaction of an externally applied axial magnetic field with the magnetic field of a cylindrical layer of positively charged particles rotating about the axis of the applied field.

In accordance with my present invention there is first provided, in an evacuated vessel, a magnetic mirror type containment field, i.e., an elongated axially symmetric magnetic field including a substantially linear central region of uniform intensity disposed between regions of increased magnetic field intensity at each end. High energy particles such as neutral atoms or molecules or molecular ions which can be dissociated and/or ionized to form high energy, i.e., relativistic charged particles, i.e., ions of a mass heavier than an electron are injected and trapped to form a cylindrical sheath or layer (E-layer) of such particles rotating about the axis of the magnetic field along the aforesaid linear central region. For example, protons may be injected as energetic molecular hydrogen particles which are dissociated to provide relativistic, i.e., high energy ions which are trapped to provide such E-layer. A sufficient number of positive particles at an appropriate energy are introduced to generate a magnetic field thereabout which interacts with the applied magnetic field creating a system of closed or partially closed magnetic field lines defining a zone for the containment of a high temperature plasma.

In contrast to the usage of a relativistic electron E-layer as described in my aforesaid patent, the effective current density of the relativistic positive particle layer, i.e., E-layer, of the present invention need not necessarily be of a magnitude that full magnetic field strength reversal occurs internally of the region defined by such layer. For example, the energy, charge and current density of the particles need only produce a 25 percent reversal of the field to provide highly beneficial effects such as elimination of instabilities. This permits utilization of a higher ratio $(\beta)$ of plasma pressure to magnetic field pressure connoting a greater economy in cost of containment. An E-layer, i.e., of positive particles, e.g., protons stabilizes the system more effectively than do relativistic electrons and also provides a greater effective volume for containment of heated plasmas. Also, at very high magnetic field intensities the use of positive ions to provide for stabilization of the fields greatly reduces synchrotron radiation losses which arise when relativistic electron E-layers are employed under similar conditions. With the present system it is possible, if desired, to accumulate the E-layer over a longer period of time so that an accelerator with a lower output current can be employed for building up the E-layer. Thereafter an appropriate fuel material is introduced into the system to be heated and ionized to form a plasma trapped in the containment zone. When utilized to produce a plasma of fusionable light nuclide elements appropriate energy utilization equipment, fuel breeder blankets, or other arrangements suitable for using energetic charged particles and neutrons may be arranged in proximity to the containment zone. An Astron reactor utilizing a plurality of sections of the presently disclosed character is disclosed in my copending application Ser. No. 867,035, filed Oct. 16, 1969 and entitled "Polygonal Astron Reactor for Producing Controlled Fusion Reactions."

Accordingly, it is an object of the invention to provide procedures and devices for producing highly elevated temperatures.

Another object of the invention is to provide procedures and devices for generating and containing a high temperature gas or plasma.

Still another object of the invention is to provide a device for producing a high temperature plasma in an axially symmetric magnetic field containment zone which is stabilized against instabilities by means of relativistic positive ion beam currents rotating in a cylindrical path therein and in which the relativistic particles may provide energy for ionizing and heating a fuel material therein.

One other object of the invention is to provide devices and procedures for producing a stably contained high temperature plasma utilizing a magnetic potential well containment zone produced by a cylindrical layer of positive ions rotating in an axially symmetric magnetic field.

Other objects and advantageous features of the invention will be set forth in the following description and the accompanying drawing, of which:

Figure 1:
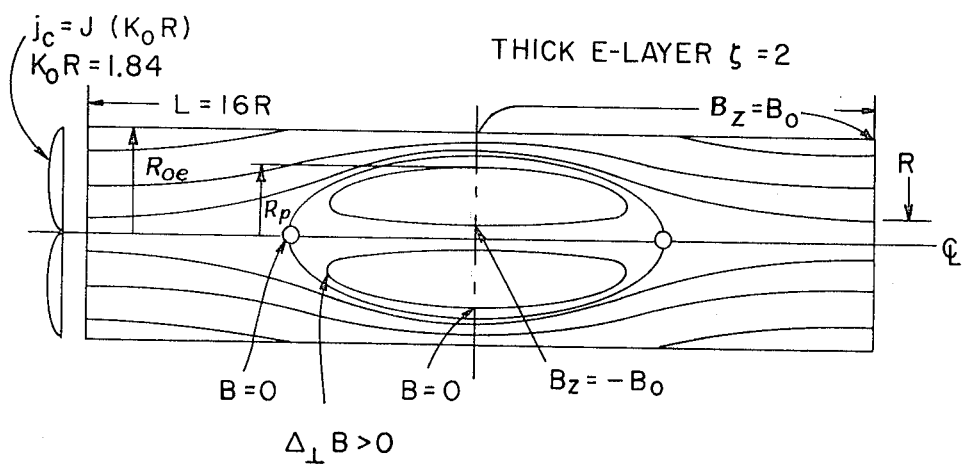
FIG. 1 is a schematic representation of a magnetic containment field for particular relations in accordance with the invention as described in the specification.

With respect to the confinement of high temperature plasmas, including those produced and utilized in controlled thermonuclear reactors, it is generally agreed that the effective period of confinement in practical systems may ultimately be determined by the so called Bohm confinement time resulting from anomalous diffusion rather than by classical diffusion processes. (For definitions as to the foregoing diffusion processes see Controlled Thermonuclear Reactions, Chapter 12, Glasstone and Lovberg, editors, published by D. Van Nostrand Co., Inc.). It has heretofore been realized that the Astron, utilizing a relativistic electron E-layer, has very favorable characteristics with respect to providing high temperature plasmas and particularly with respect to stabilizing a magnetic confinement zone against instabilities which arise with other systems to impose very high plasma loss rates thereon. However, in scaling the size of the aforesaid E-layer Astron reactor to larger power ratings so as to shorten the time required to heat the plasma and improve the total confinement time it is contemplated that synchrotron radiation losses may increase to undesirable levels. The levels at which this effect is to be noted is with magnetic fields, e.g., above about 50 to 100 kilogauss, with electron energies increased commensurately above 20 MeV and upwards into the BeV range, and with increasing thickness of the E-layer. Accordingly, it is now proposed to employ a particle heavier than an electron to provide such an E-layer. From the circumstance that the synchrotron radiation loss is inversely proportional to the square of the rest mass, it follows that relativistic protons and other charged particles having a mass number of at least one have superior characteristics for providing such a layer, herein termed, for example, a proton E-layer, in order to reduce the loss from synchrotron radiation. It would of course also be possible to employ deuterons, tritons, and helium ions in a similar manner when an even heavier positive ion is desired. Other advantages accrue in using such a low atomic number charged particle E-layer since a higher energy content is also available for heating a plasma, larger plasma volumes may be attained, and the higher momentum (mass) of the layer provides, in effect, a stiffer layer which stabilizes the containment magnetic field system more effectively against instabilities than would a comparable relativistic electron E-layer, all as shown hereinafter.

The magnetic field pattern produced by a relativistic charged particle cylindrical E-layer rotating about the axis in the central linear region of a magnetic mirror field, disposed between terminal regions of increased intensity, as well as the relationship which such a system has to the Bohm confinement time will now be discussed. At the outset it may be noted that the cylindrical charged particle E-layer rotating about said field axis represents an electrical current which produces a magnetic field which opposes the applied external magnetic mirror field. The number of particles in the E-layer required to reverse the external magnetic field is almost independent of its thickness. However, the thicker the E-layer, the greater the containment zone volume available for plasma confinement. An exemplary solution will be demonstrated for a very thick positive particle, e.g., proton E-layer, i.e., where the outer radius of the E-layer is almost twice its mean radius with relations and the results shown in FIG. 1 of the drawing. The current distribution in the radial direction is assumed to be proportional to $J_1(k_o r)$ while in the axial direction the familiar $\sin^2(kz)$ distribution has been assumed.

The vector potential within the E-layer region is $$A_\theta = \frac{B_1 r}{2} + \frac{\eta_e}{(kR)} I_1(kr) \cos(kz) + \frac{\eta_o}{k_o R} J_1(k_o r) \sin^2 \frac{kz}{2}, \quad (1)$$

where $$B_1 = B_0 \left\langle 1 - \frac{\eta_o}{2} J_o(kR_{oe}) \right\rangle$$

$$k_o R = 1.84$$

$$k = \frac{2\pi}{L}$$

and $L$ and $R_{oe}$ are the length and the outer radius of the E-layer respectively.

The first two terms in Eq. (1) represent the field generated by the external solenoid. The third term represents the field generated by the E-layer currents. The constant $\eta_o$ depends on the value of $\zeta$ while the constant $\eta_e$ is determined by the imposed boundary condition that $B_z = B_o$ all along the outer surface of the E-layer. The constants $n_e$, $n_o$ are $$\eta_e = \frac{\eta_o J_o(kR_{oe})}{2 \; I_o(kR_{oe})} \quad (2)$$

$$\eta_o = -\frac{\zeta(B_0 R)}{\left(1 + \frac{k^2}{2k_o^2}\right)\langle 1 - J_o(kR_{oe})\rangle} \quad (3)$$

and $\zeta$ is the ratio of the current per cm of the E-layer at its symmetry plane to the current per cm of the external solenoid when it creates a uniform central field $B_o$. The value of $B_o$ is defined by the equation $$B_o = \frac{(\gamma^2 - 1)^{1/2} mc^2}{eR}. \quad (4)$$

wherein $\gamma$ is the proton energy in rest mass units The maximum current of the E-layer is at $r = R$, $Z = L/2$, namely $$\frac{4\pi j_e}{c} = k_o B_o \frac{\zeta J_1(k_o R)}{1 - J_o(kR_{oe})}. \quad (5)$$

The value of the ratio $\omega_b^2/\omega_c^2$, where $\omega_b$ is the beam plasma frequency and $\omega_c = eB_o/\gamma\, mc$ at the point of maximum electron density, is $$\frac{\omega_b^2}{\omega_c^2} = \zeta \left( \frac{c}{\bar{v}_\theta} \right) \frac{(k_o R) J_1(k_o R)}{1 - J_o(k_o R_o)} \quad (6)$$

where $\bar{v}_\theta$ is the average azimuthal velocity. Substituting numerical values we find $$\frac{\omega_b^2}{\omega_c^2} = 0.763 \left( \frac{c}{\bar{v}_\theta} \right) \zeta \quad (7)$$

Thus in a thick E-layer at the level of field reversal, ($\zeta = 1$), the quantity $\omega_b^2/\omega_c^2$ is approximately unity.

With the help of the above equation the magnetic lines can be plotted noting that a particular magnetic line ($r A$) is a constant. The result is shown in FIG. 1 for $\zeta = 2$. The contour enclosing a true magnetic potential well is also shown in FIG. 1. Observe that the E-layer itself is a relativistic plasma confined in an open ended magnetic mirror field configuration. Moreover, the E-layer encloses a torus having an aspect ratio of about unity wherein a closed magnetic well is formed.

The radius of the closed magnetic well $R_p = 1.4\, R$. The axial component of the magnetic field is governed in the region $R < r < R_p$ by the term $J_o(k_o r)$ and the values of the argument range from 1.84 to 2.58, with the value 1.84 being shown in FIG. 1. In this range the $J_o$ function varies almost linearly. Therefore for the sake of simplicity we can assume a linear variation of the field in this region for the diffusion calculations. Further, we assume that the plasma currents will be created according to the pattern of the E-layer current. Thus the plasma density of $z = L/2$ is $$n = n_o \left[ 1 - \left( \frac{r - R}{0.3 R_p} \right)^2 \right]. \quad (8)$$

Within the magnetic well the contribution to the E-layer current from the component $$\frac{\partial B_z}{\partial r} \text{ is } \left( \frac{k_o}{k} \right)^2$$

times the contribution from the component $$\frac{\partial B_r}{\partial z}$$

Since the current is very small using the assumed parameters of the E-layers (FIG. 1), $(k_o/k)^2 = 22$, if we neglect the z-dependence of the plasma currents in the diffusion calculations, we can write the diffusion equation $$\nabla \cdot D \nabla \eta + s = 0 \quad (9)$$

for most of the plasma volume; thus $$\frac{\partial r}{r \partial r} \left( D \frac{\partial n}{\partial r} \right) + s = 0, \quad (10)$$

where $s$ is the number of ions per second required, per unit volume, to be created in order to maintain the plasma in diffusion equilibrium. Thus, if the source distribution ($s$) is maintained as calculated from Eqs. (8) and (10), the plasma currents will have the same functional dependence as the E-layer currents. Thus as the plasma is built up the loading factor $\zeta$ of the E-layer can be reduced, so that the total currents within the magnetic well remain constant.

Substituting the Bohm diffusion coefficient, for the diffusion coefficient in equation 10, i.e., $$D_B = \frac{\mu c}{16B},$$

where $\mu$ is the plasma temperature in esu, and $c$ is the velocity of light, we determine ($s$). Then integrating the source ($s$) along the radius from $r$ to $R_p$ we find $$\dot{N} = \frac{\pi n_o}{4} \frac{\mu c}{B(R_p)} \frac{R_p}{(R_p - R)} \text{ ions/cm. sec.} \quad (11)$$

Integrating the plasma density from $r = 0$ to $r = R_p$ we find
$$N = 0.75 \, \pi R_p^2 n_o \text{ ions/cm.} \quad 12.$$
Then the Bohm confinement time is:

$$T_B = \frac{3B(R_p)R_p(R_p - R)}{\mu c} \text{ sec.}$$

where $B_o$ = intensity of magnetic field
$R_p$ = radius of the plasma and of the magnetic potential well produced by the positive particle E-layer
$R$ = radius of E-layer
$\mu$ = plasma temperature in esu
$c$ = velocity of light
If $B = 0.5$ plasma pressure/magnetic field pressure and E-layer loading factor $-1$ then $B(R_p) = 0.84 \, B_o$ and:

$$T_B = \frac{2.5 \, B_o R_p (R_p - R)}{\mu c} \text{ sec.} \quad (13)$$

This latter equation can be used as discussed hereinafter, irrespective of the value of $B$, for certain comparison.

The energy release by fusion is proportional to $\beta^2 B_o^4 R_p^2$, while the energy stored in the plasma is proportional to $\beta B_o^2 R_p^2$. Therefore, the allowed plasma confinement time, $T_f$, which is the ratio of the stored energy to the energy released by fusion in the form of charged particles trapped in the plasma, e.g., alpha particles resulting from a TD fusion reaction is $$T_f \alpha \beta^{-1} B_o^{-2}. \quad 14.$$
Consequently:
$$T_f/T_B \alpha (B_o R_p)^{-3} R_p. \quad 15.$$
This ratio indicates how much greater the confinement time should be in comparison to the Bohm confinement time for a significant rate of reaction to occur. With 50 MeV electrons the ratio $T_f/T_B$ is of the order of several hundred thousand. We observe that this ratio is inversely proportional to the cube of the momentum of the particles. Therefore, when employing positive particles, i.e., ions in the BeV range, the tolerable diffusion rate could be almost as high as the Bohm diffusion rate and a fusion reaction could still occur. Since the synchrotron radiation loss is inversely proportional to the square of the rest mass, it follows that relativistic protons i.e., with energies above about 50 MeV, are a better choice for an E-layer in the BeV range than are relativistic electrons. Thus none of the advantages of the relativistic electrons are lost while we do away with the restriction of the synchrotron radiation.

Nuclear reactions, i.e., inelastic scattering, now enter the picture. In each collision of a relativistic proton with a nucleon, at rest, the maximum energy loss or transfer ($\Delta \gamma$) is
$$\Delta \gamma = [2(\gamma + 1)]^{1/2} - 2. \quad 16.$$
Thus only a fraction of the proton energy is available in the center-of-mass system. If a large number of particles undergo inelastic collisions with the deuterons and tritons of the plasma the average energy loss is smaller than the maximum given by Eq. 16. The exact ratio of the average to the maximum energy loss can be calculated precisely from the existing energy spectra of the mesons created in the inelastic collisions. However the following calculations are an approximation thereof:

$$\langle \Delta \gamma \rangle = \frac{2}{3} (\Delta \gamma). \quad (17)$$

The probable scattering angle of the primary particle in each inelastic collision is ($1/\gamma$). Thus relativistic protons are confined within the E-layer until after they undergo several collisions. The inelastic collision cross-section is approximately 25 mb (millibarn) per nucleon. Thus, assuming that the plasma is a mixture of 50 percent deuterium and 50 percent tritium, the average collision cross section per ion is approximately 60 mb. For a given initial proton energy, the allowed number of inelastic collisions can be easily calculated by known methods and the E-layer proton lifetime can be determined as a function of the plasma density. The plasma confinement time ($t_f$) when the energy source is the energetic alpha particles from a (TD) reaction approximates the ratio of the energy stored in the plasma to the heat input to the plasma from the trapped 3.5 —MeV alpha particles. This is a straight-forward calculation so that the final result is presented as follows:

$$T_f = \frac{0.132}{\beta(\gamma^2 - 1)} \left(\frac{R_p}{100}\right)^2 \left(\frac{\mu}{10}\right)^2 \left(\frac{10^{-16}}{\overline{\sigma v}_{DT}}\right) \text{ sec.} \quad (18)$$

where $\beta$ is the ratio of the plasma pressure to the pressure of the external field $B_o$, $R_p = 1.4 R$, $\mu$ is the plasma temperature in keV, and $\overline{\sigma v}_{DT}$ is the reaction rate in (cm³/sec) corresponding to temperature $\mu$, i.e., at $\mu = 20$ keV, $\overline{\sigma v}_{DT} = 4.2 \cdot 10^{-16}$ cm³/sec. Finally, $\gamma$ is the proton energy expressed in rest mass units. The value of the external magnetic field $B_o$, the plasma radius $R_p$, and the proton energy are related by the equation, $$(\gamma^2 - 1)^{1/2} \frac{Mc^2}{e} = \frac{B_o R_p}{\sqrt{2}}. \quad (19)$$

The ratio ($T_f/T_B$) is then $$\frac{T_f}{T_B} = \frac{420}{\beta(\gamma^2 - 1)^{3/2}} \left(\frac{R_p}{100}\right) \left(\frac{\mu}{10}\right)^3 \left(\frac{10^{-16}}{\overline{\sigma v}_{DT}}\right). \quad (20)$$

An important question can be raised now as to whether or not the inherently available heat input to the plasma through Coulomb scattering interactions with the E-layer protons is sufficient to heat the plasma to fusion temperature even if the plasma confinement time would be as short as allowed by the time $T_f$. The allowed plasma confinement time ($T_E$) when it is heated only by the E-layer is the ratio of the energy stored in the plasma to the energy loss of the E-layer to the plasma by Coulomb scattering.

The energy transfer loss ($W_e$) of the E-layer to the plasma is simply $$W_e = \frac{\sigma_o \bar{n} \bar{c}}{\beta_e} \frac{\zeta \gamma}{2 r_e} Mc^2 \text{ ergs/cm. sec.}, \quad (21)$$

where $\beta_e = v/c$, $\sigma_o = 2 \cdot 10^{-23}$ cm², and $n$ is the average plasma density. The energy stored in the plasma is
$$W_j = \pi R_p^2 (2 \bar{n} e u) \text{ ergs/cm.} \quad 22.$$
substituting numerical values we find $$T_E = \frac{0.68(\gamma^2 - 1)^{1/2}}{\zeta \gamma^2} \left(\frac{R_p}{100}\right)^2 \left(\frac{\mu}{10}\right) \text{ sec.} \quad (23)$$

where $\mu$ is the plasma temperature expressed in keV.
Finally, the ratio ($T_E/T_B$) is $$\frac{T_E}{T_B} = \frac{2200}{\zeta \gamma^2} \left(\frac{R_p}{100}\right) \left(\frac{\mu}{10}\right)^2. \quad (24)$$

The values of $T_f$, $T_E$, ($T_f/T_B$), for $B_o = 100,000$ G are given in Table 1 for $\gamma = 2, 3$, and 6.4.

TABLE 1.—Comparison of confinement times ($B_0 = 100,000$ G).

| $\gamma$ (rmμ) | $T_f^a$ (m.sec.) | $T_E^b$ (m.sec.) | $\dfrac{T_f^a}{T_B}$ | $\dfrac{T_E^b}{T_B}$ | $\beta$ | $10^{-15}n_0$ (ion/cm.³) | $R_p$ (cm.) |
|---|---|---|---|---|---|---|---|
| 2 | 72 | $85\left(\dfrac{\mu}{10}\right)$ | 350 | $210\left(\dfrac{\mu}{10}\right)^2$ | 0.35 | 2.1 | 76 |
| 3 | 72 | $153\left(\dfrac{\mu}{10}\right)$ | 130 | $140\left(\dfrac{\mu}{10}\right)^2$ | 0.35 | 2.1 | 124 |
| 6.4 | 110 | $377\left(\dfrac{\mu}{10}\right)$ | 40 | $77\left(\dfrac{\mu}{10}\right)^2$ | 0.23 | 1.4 | 276 |

$^a$ At $\mu = 20$ keV.
$^b$ At $\zeta = 2$.

We observe that the Lawson criterion ($n_0T_f=10^{14}$) is satisfied. The most important observation however is that the confinement time which can be tolerated is as low as 350 Bohm confinement time at $\gamma = 2$, while at $\gamma = 6.4$ the tolerated confinement time can be as low as 40 Bohm. In the first two cases the E-layer can heat the plasma up to 10 keV without taking into account the heat input from fusion. This result indicates a large margin since at 10 keV the heat input from fusion in the TD reaction is several times higher than the heat input from the E-layer. In the last case the E-layer heats the plasma up to a temperature of 7.5 kev. If the confinement time $T_E$ at this temperature is not less than 40 $T_B$, then the fusion energy is still higher than the heat input from the E-layer. Before drawing any conclusion, however, we shall calculate the output power from the plasma volume associated with each of the above three examples, the energy loss of the E-layer, and the quantity $Q_e$, which is the ratio of the produced electric power to the input power required for the proton accelerator.

The proton lifetime depends on their energy, the plasma density, and the ratio of the number of protons present in the volume where the plasma is confined to the total number of protons in the E-layer. In an E-layer configuration where length $L = 16R$ the average length of the plasma volume $L_p$ is
$$L_p \approx 2R_p. \qquad 25.$$
The quantity $Q_e$ in the temperature range 20 to 40 keV is $$Q_e = \frac{5.8\beta N_c}{\zeta}\left(\frac{\gamma+1}{\gamma-1}\right)^{1/2}, \qquad (26)$$

where $N_c$ is the number of collisions the protons undergo before they are lost from the organized motion of the E-layer. In deriving the value of $Q_e$, we have assumed an efficiency of the power plant of 45 percent, an accelerator efficiency of 70 percent, and that two-thirds of the proton energy is trapped in the system while one-third escapes in the form of neutrinos. The E-layer and plasma parameters, the quantity $Q_e$ (the net output power), and the proton beam power are listed in Table 2. In the table are also listed the total energy stored in the plasma and the E-layer respectively, as well as their ratio $k$. We observe that this ratio is very small, which should be a consideration for stability calculations.

The output power in the first two cases ($\gamma = 2$ and 3) ranges from 800 to 4,400 MW, which is a plausible range of power level for breeder type thermonuclear reactors. The last case ($\gamma = 6.4$) yields a rather large output power but it is listed in order to show that a confinement time as low as 40 Bohm can be utilized if necessary. It is of interest to compare the figure of merit $Q_e$ of a reactor achievable with plasma confined under the same conditions in a proton E-layer and an electron E-layer. For simplicity we neglect the synchrotron radiation loss of the relativistic electrons and the Coulomb scattering loss of the protons. We have assumed that in both cases the plasma is confined under the same geometry.

$$\frac{Q_{ep}}{Q_{ee}} = \frac{W_{ee}}{W_{ep}}\frac{W_{fp}}{W_{fe}}, \qquad (27)$$

where $W_{fe}$ and $W_{fp}$ are the fusion energy production per cm, and $W_{ee}$ and $W_{ep}$ are the energy losses per cm of an electron E-layer and a proton E-layer respectively.

The quantities $W_{ee}$ and $W_{ep}$ are $$W_{ee} = \eta_e c\sigma_0 \frac{\gamma_e}{2r_e}\zeta mc^2 \qquad (28)$$

$$W_{ep} = \frac{\eta_p\beta_e\sigma_i c}{N_c}\left(\frac{\gamma_p}{2r_e}\right)\left(\frac{M}{m}\right)^2(\gamma_p-1)\zeta mc^2, \qquad (29)$$

where $$\beta_e\gamma_p = \sqrt{\gamma_p^2-1}, \qquad (30)$$

$\sigma_i = 6.10^{-26}$ cm² (the inelastic scattering cross section between an E-layer proton and a plasma ion), and $n_e$ and $n_p$ are the plasma densities confined in an electron and proton E-layer respectively.

$$\frac{W_{ee}}{W_{ep}} = \frac{\eta_e}{\eta_p}\frac{N_c\sigma_0\gamma_e}{\sigma_i(\gamma_p+1)^{1/2}}\frac{(m/M)^2}{(\gamma_p-1)^{3/2}}. \qquad (31)$$

Then $$\frac{Q_{pp}}{Q_{ee}} = \frac{N_c\sigma_0}{\sigma_i\gamma_e}\left(\frac{\gamma_p+1}{\gamma_p-1}\right)^{1/2}. \qquad (32)$$

Substituting numerical values we find $$\frac{Q_{ep}}{Q_{ee}} = \frac{330 N_c}{\gamma_e}\left(\frac{\gamma_p+1}{\gamma_p-1}\right)^{1/2}. \qquad (33)$$

For $\gamma_p = 3$, $N_c = 3$, and $\gamma_e = 100$, $$\frac{Q_{ep}}{Q_{ee}} = 14. \qquad (34)$$

TABLE 2.—Parameters of the E-layer and the plasma for a scaled up Astron.

| E BeV | $\gamma$ rmμ | $N_c$ | $R_p$ cm. | $R_{E_0}$ cm. | $L$ cm. | $\beta^c$ | $10^{-15}n_0^a$ ions/cm.³ | $\dfrac{T_f^b}{T_B}$ | $\dfrac{T_E^b}{T_B}$ | $W_{fp}$ MJ | $W_{fE}$ MJ | $\kappa = \dfrac{W_{fp}}{W_{fE}}$ | $\dfrac{0.3R_p^a}{\overline{\rho}_i}$ | $Q_c$ | $W_p$ MW | $W_e$ MW |
|---|---|---|---|---|---|---|---|---|---|---|---|---|---|---|---|---|
| 0.94 | 2 | 1.5 | 76 | 108 | 810 | 0.35 | 2.1 | 350 | $210\left(\dfrac{\mu}{10}\right)^2$ | 25 | 520 | 0.048 | 26 | 5.2 | 220 | 800 |
| 1.88 | 3 | 3.0 | 124 | 176 | 1,320 | 0.35 | 2.1 | 130 | $140\left(\dfrac{\mu}{10}\right)^2$ | 125 | 2,600 | 0.048 | 46 | 8.5 | 580 | 4,400 |
| 5 | 6.4 | 5.0 | 276 | 392 | 2,000 | 0.23 | 1.4 | 40 | $77\left(\dfrac{\mu}{10}\right)^2$ | 600 | 23,000 | 0.026 | 85 | 7.8 | 2,100 | 14,500 |

$^a$ At $\mu = 20$ keV.
$^b$ At $\zeta = 2$.
$B_0 = 100,000$ G, $\zeta = 1$.
$^c$ $\beta = 0.5$ however, in respect to the magnetic pressure at $r = R_p$.
$W_e$ is the net output power.
$W_p$ is the proton beam power.

Another quantity listed in the table is the ratio ($0.3 R_p/\overline{\rho}_i$), which is the ratio of the plasma thickness to the mean gyroradius of the ions. We observe that in the second case the plasma thickness is almost 50 gyroradi, which should be adequate to stabilize the plasma and minimize plasma losses caused by drift instabilities.

The foregoing consideration results in several findings:
1. The ratio of the allowed plasma confinement time to the so-called Bohm confinement time is inversely proportional to the cube of the momentum of the E-layer particles (for a fixed gyroradius; for fixed field it is inversely proportional to the square of the momentum). An E-layer with relativistic protons in the range of 1 to 5 BeV allows plasma confinement times to be as low as in range of 400 to 40 Bohm confinement times respectively. 2. The unique property of the E-layer, i.e., the combination of magnetic fields yielding a closed magnetic well, is now supplemented with a new stabilizing property, namely the highest possible number of ion gyraradii can be accommodated within the plasma radius. This results from the fact that the aspect ratio of the toroid, created by the true magnetic well within the E-layer, can be of the order of unity; thus for a given plasma volume a much larger radius is allowed than in any other toroidal scheme. 3. The present system presents a very favorable system since, although a plasma is confined in the E-layer under the most favorable conditions from the stability aspect, the margin against enhancement of the diffusion rate by instabilities which may be created by the existence of the plasma density gradient (drift instabilities, etc.) is enormous in view of the fact that plasma confinement times as short as 40 Bohm can be tolerated. This margin may allow a plasma $\beta$ much higher than the conservative value ( $\beta = 0.5$) assumed herein. Since the quantity $Q_e$ is actually proportional to the ratio $\beta/(1-\beta)$, an increase of the quantity $\beta$ to 0.75 for example, will result in an increase of $Q$ to 15 and 25, for $\gamma = 2$ and 3 respectively. 4. For the same value of $\beta$, the $Q$ is almost 10 times higher than the achievable value with 50-MeV electrons. Thus the economy resulting from the higher value of $Q$ should compensate for any higher cost of a relativistic proton versus the cost of a relativistic electron accelerator. 5. The most important finding is that the energy transfer from the E-layer to the plasma through Coulomb scattering with protons is quite effective. Therefore a proton energy as low as in the energy range of 1 to 5 BeV is adequate to heat the plasma above the ignition temperature of a TD fusion reaction, i.e., above 5 keV.

Figure 3:
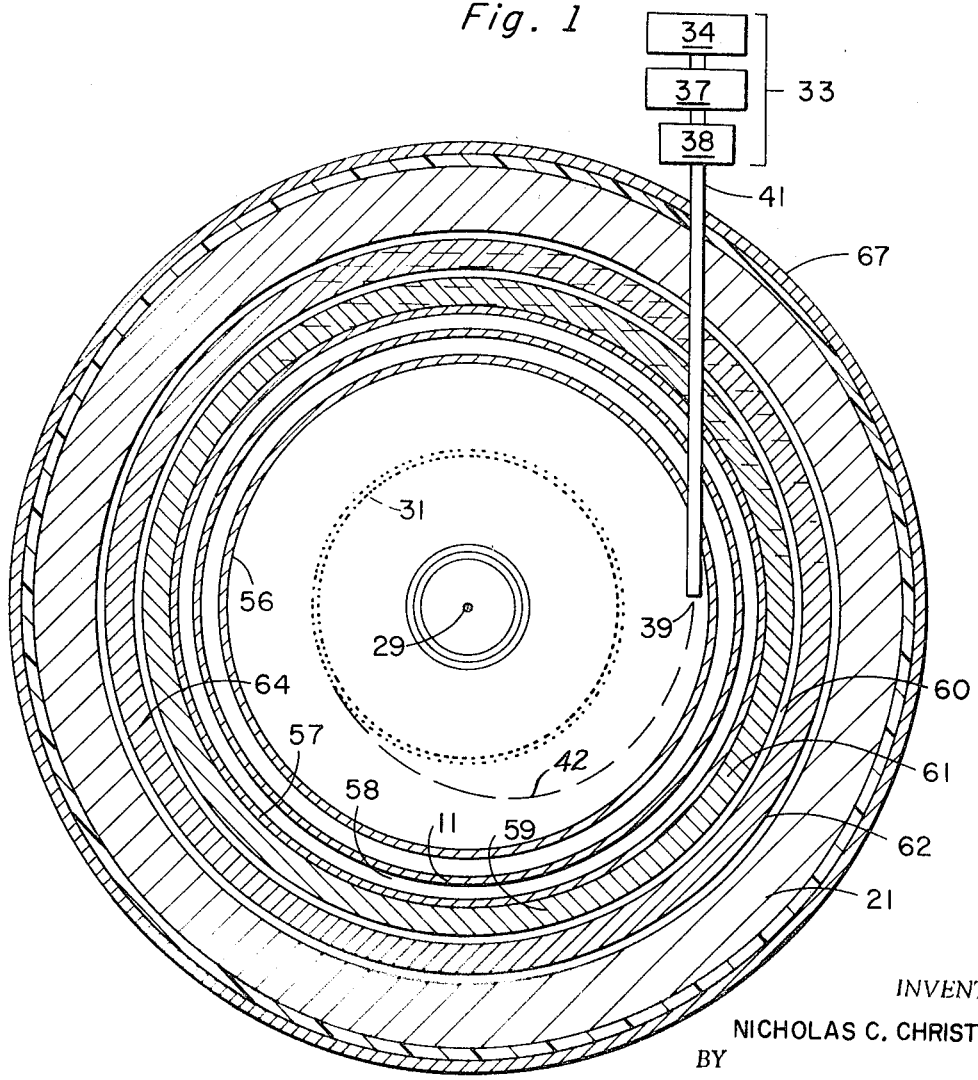
FIG. 3 is a transverse cross-sectional view taken along the plane 3—3, of FIG. 2.
Figure 2:
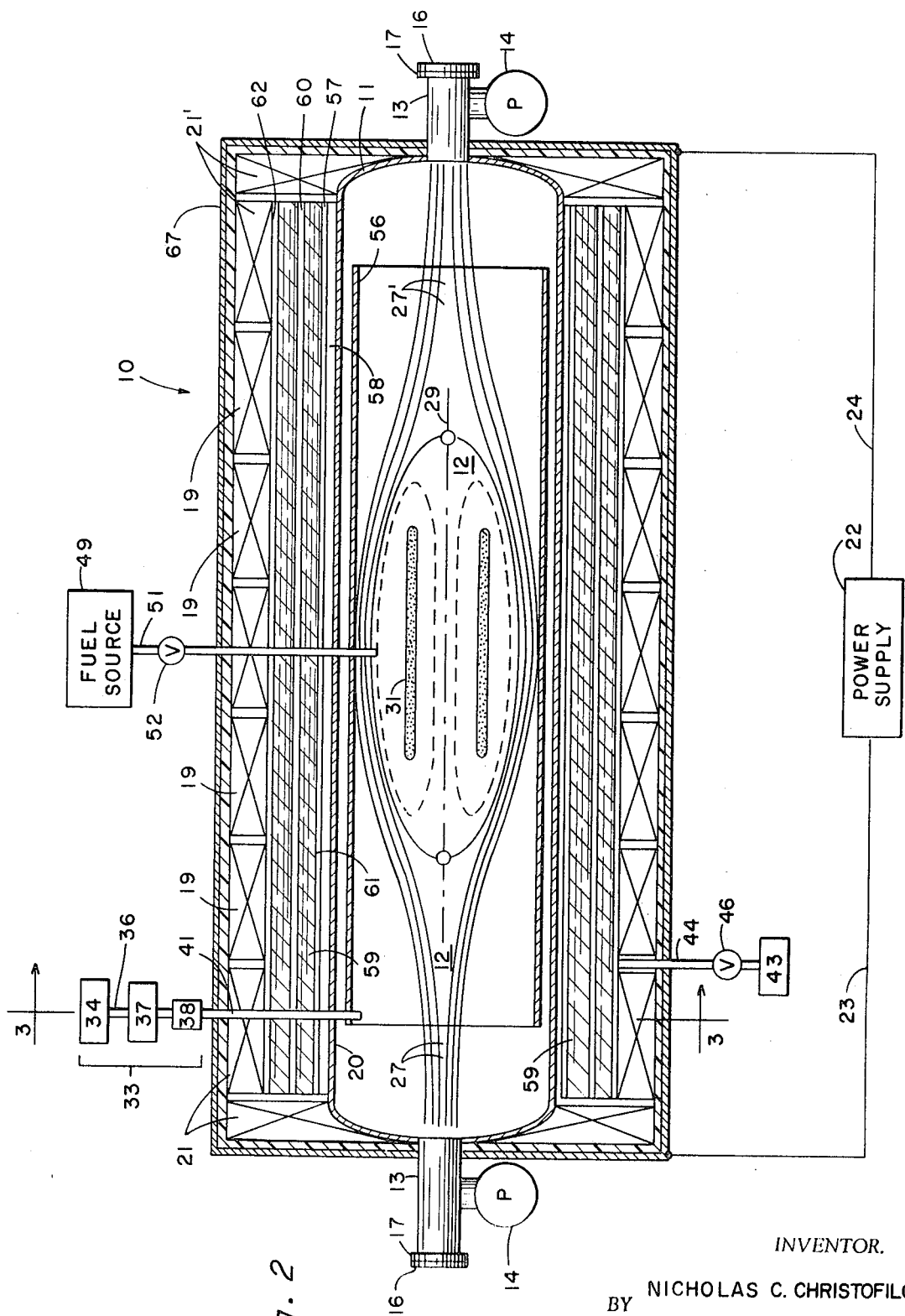
FIG. 2 is a cross-sectional schematic view of a linear high temperature plasma or controlled thermonuclear reactor in accordance with the invention.

A proton E-layer thermonuclear reactor embodiment 10 with which the foregoing benefits may be obtained is illustrated in FIGS. 2 and 3 of the drawing. In the event that the device is to be employed to provide a contained high temperature plasma of fusionable ions, the device may be termed a controlled fusion or thermonuclear reactor by which term the device will be designated hereinafter. The reactor 10 is provided with a closed elongated cylindrical magnetically pervious vessel 11 defining a vacuum chamber 12 therein. Conduits 13 may be provided terminally of said vessel or as otherwise convenient for coupling to vacuum pumps 14 which are capable of generating vacuum pressures below one micron Hg ($10^{-6}$mm) in chamber 12. Access to said chamber 12 is provided as necessary as by removal of vacuum gasketed covers 16 which may be attached to the outer flanged ends 17 of said conduits as by means of bolts (not shown). A solenoidal coil 19, preferably a superconductor, cryogenic or other low loss conductor coils, and having a uniform ampere turns distribution is disposed concentrically spaced about the cylindrical wall portion 20 of vessel 11. Coil segments 21, 21', of a type similar to coil 19 and connected in series with coil 19, are disposed concentrically circumjacent the ends of vessel 11. Coils 21, 21' have an increased ampere turns distribution relative to coil 19; therefore, upon energization with a direct current electrical potential as from a power supply 22, through transmission lines 23, 24, there is produced in chamber 12 a magnetic field which is symmetric about the axis 29, of vessel 11. Such magnetic field has an elongated linear uniform intensity central region, provided by coil 19 and bounded terminally by regions 27 and 27', respectively, of increased magnetic field intensity produced by coils 21, 21', respectively. In usual practice the ratio of the intensity of the magnetic fields 27, 27', to the intensity of field region 26 is in the range of about 1.1 to 3.0. The intensity of the central field region may range from a few hundred gauss, e.g., 500 in laboratory devices to as high as about 250 kilogauss in a full scale power producing thermonuclear reactor. Typical values for a reactor may well be selected in the range of about 50 kilogauss to 200 kilogauss.

To provide for effective and stable containment of the final heated plasma in the magnetic field of reactor 10, a cylindrical positive ion, e.g., relativistic proton sheath or layer (E-layer) 31 is established to rotate about the centerline or axis 29 in the linear central portion of the magnetic mirror field of reactor 10. The aspect ratio of such a layer may range from below about 1:1, to about 5:1 length to diameter. The magnetic field of the circulating positive particle currents of said layer 31 interacts with the applied magnetic mirror field to produce, in the vicinity of and in the space enclosed by E-layer 31, a system of closed or partially of closed magnetic field lines defining a magnetic well containment zone for the final heated plasma as described above. More particularly, the density and energy of the E-layer particles, in effect, being a circulating electrical current, can be of such a low magnitude that at least a partial reversal of the applied field occurs or it may be of such an elevated magnitude that full reversal of the applied field occurs within the space in the vicinity of that occupied by the E-layer 31. A system of fully closed magnetic field lines is formed in the latter case which defines the final containment zone for the ultimate heated plasma. Positive ions suitable for producing such a positive particle E-layer 31 include $H^+$, $D^+$, $T^+$, $He_3^+$, $He_4^+$, etc., singly or in admixture, particularly, when thermonuclear reactions are produced in the reactor 10. While energetic neutral atoms or molecules may be employed to produce such ions, it is generally preferred to employ high energy molecular ions. To obtain such a layer 31, high energy molecular ions such as $H_2^+$, $D_2^+$, $TD^+$, $T_2^+$, or the like may be produced for example, in a molecular ion beam generator 33, by methods which are well known in the art. If desired, more than one generator can be used.

More particularly, in accord with one such method the molecular ion beam generator 33 may include a molecular ion source 34 which directs a beam of molecular ions through an accelerator 36 to raise the molecular ions to the desired energy level. The beam of accelerated molecular ions may then be directed through a solenoidal magnet focusing lens 37 and the collimated beam, emergent therefrom, may be directed through a quadrupole purifying lens 38, if needed, to yield a collimated molecular ion beam, as shown in FIG. 3, which is directed through a magnetic shield guide tube 41 into the magnetic mirror field. The tube 41 is usually inclined at a small angle, e.g., 10° to a plane perpendicular to the axis 29 with the guide path thereof tangent to circle (not shown) of at least twice the desired diameter of E-layer 31 and coaxial therewith somewhat as shown in FIG. 3 which is not drawn to scale. Accordingly, upon emergence from the beam guide tube 41 the molecular ion beam 39, e.g., a beam of $H_2^+$ molecular ions travels on a path tangent to said circle. However, when the molecular ion beam collide with neutral residual gas molecules and/or any ions present, e.g., as background plasma, in said path the molecular ions are dissociated to form hydrogen ions, i.e., protons which have a charge to mass ratio of twice that of said molecular ions. Background plasma may be formed as a byproduct of beam injection. While any gas such as air can produce such a plasma, it is generally preferred to provide a hydrogen background atmosphere at least when a plasma of light nuclides is to be produced. At magnetic field intensities of about 150 kilogauss, Lorentz forces also are effective to ionize the molecular ions in the absence of plasma or residual gas molecules. As a consequence of the change in charge to mass ratio which occurs on ionization the high energy protons follow an inwardly curved path, e.g., path segment 42 and due to the inclination of guide tube 41, the beam travels inwardly along the axis 29. The protons are trapped so as to spiral along the linear central field portion and to be reflected back and forth between mirror field 27, 27' to form the cylindrical proton E-layer 31 rotating about axis 29. Such a beam 39 may be introduced as high current pulses, if pulsed operation is desired, or the beam 39 may also be introduced as in a smaller continuous current of molecular ions over an extended time period. The E-layer, may be accumulated or trapped in either case to attain the desired current density. Steady state or intermittent operation may be initiated by either procedure.

Improved trapping of the molecular ion beam 39 may be obtained, for example, during an initial injection time period, by introducing light nuclide gas cloud into the path of beam 39. With pulsed operation, intermittent puffs of vapor may be introduced. For example, lithium vapor may be generated in a heated reservoir 43 and directed through a conduit 44 to intersect the path of beam 39 with vapor flow being regulated by a valve 46. Once a sufficient plasma density or background gas density is achieved to assure high ionization efficiency with respect to the injected molecular ion beam the flow of lithium vapor may terminate.

In any event, as the trapping of the molecular ion proceeds to form such a proton or other positive ion E-layer, a system of partially closed field lines is formed at low E-layer current and at a higher level a system of closed magnetic field lines, is formed. The provision of such a system of closed or partially closed magnetic field lines which inherently includes a minimum-B field zone or potential well provides for stable confinement of plasma, i.e., a containment field with an isotropic pressure for appropriate configurations providing a field line curvature which is stabilized against destabilizing curvature drifts. At the same time, hydromagnetic instabilities and high frequency microinstabilities due to loss cone instabilities caused by anisotropic velocity distributions, i.e., non-maxwellien distributions are also suppressed. For comparison, the momentum of 2 BeV relativistic protons in a proton E-layer is 60 times greater than that of 50 MeV relativistic electrons so that the product of the magnetic field and radius of the confinement zone can be increased sixty fold using a proton E-layer. This factor provides a much longer confinement time than a relativistic electron E-layer can provide under similar conditions. With a fully formed proton E-layer, protons having an energy range of at least 1 to 5 BeV can by themselves provide sufficient energy to heat a TD plasma fuel to fusion temperature.

A proton or other positive ion E-layer, with particle energies in the range of a few hundred MeV to about 1 BeV wherein the energy content is not sufficient in itself, to heat the fuel to fusion temperatures can be used, to provide a magnetic well containment zone with closed lines force, to provide for stable confinement of a high temperature plasma. In such cases the required depth of the magnetic potential well ($\Delta B/B$) is of the order of at least 25 percent for equivalent electronion temperatures in the plasma. A containment field system with these characteristics may be employed following ignition of a thermonuclear reaction in a steady state reaction or in later stages of pulse operation when energy from the fusion reaction is available to maintain the necessary temperature level. To attain the indicated condition the current and/or the energy level of the injected molecular ion beam is reduced.

This operating practice may also be employed where supplementary heating is supplied, e.g., by introduction of heated fuel materials or by the use of any other supplementary heating method. Moreover, the quantity ($\omega_{pE}^2/\omega_{cE}^2$) is a criterion of E-layer stability where $\omega_{pE}$ is the particle plasma frequency and $\omega_{cE}$ is their gyrofrequency. The current density of such a layer to create a magnetic well ($\Delta_B/B$) = 0.25 in outwardly diverging portions of the external field is 50 percent of that required for full field reversal. The corresponding value of ($\omega_{pE}^2/4G_{cE}^2$) for a thick layer is 0.50.

Finally, a thermonuclear fuel or other material appropriate for forming the desired final high temperature plasma is then introduced into said containment zone to be ionized, trapped and heated by interaction with the particles of the E-layer.

An appropriate material for forming the plasma, termed "fuel material" herein, may be introduced from a source means 49 as through a tube 51 and as controlled by an appropriate valving or metering means 52. A gaseous or fluid fuel (not shown) stored under appropriate pressurized conditions therein may be introduced in a thin stream or as droplets. A solid (not shown) may be similarly dropped in pellet or powder form. The foregoing fuel forms being electrically neutral can penetrate the magnetic field to enter the E-layer region whereat the energetic particles heat, and ionize the fuel which is simultaneously trapped and contained in said containment zone to form, e.g., a thermonuclear reaction plasma. Other procedures are known for introducing relatively cold fuel materials into such a containment zone and may likewise be employed. One such procedure, disclosed in U.S. Pat. No. 2,997,431 issued Aug. 2, 1961 to P. R. Bell et al., involves the injection of "cold" or low energy neutral particles into a magnetic mirror containment system.

Fuel materials which are suitable for use in producing thermonuclear or fusion reaction plasmas such as those which yield large quantities of neutrons with a large thermal output include tritium-deuterium mixtures (T–D), deuterium D—D), He$^3$ and possibly lithium isotopes. Solid forms of the aforesaid hydrogen isotopes suitable for injection as above include frozen or liquified T–D mixtures, fluid or solid tritiated-deuterated hydrocarbons, solid or molten mixtures of lithium-tritide and lithium deuteride, etc. It is also possible to introduce deuterium, tritium, or the like, as an energetic molecular ion beam by the procedures described above to supply at least one of the reactants. It will be appreciated that similar forms of substantially any element may be introduced similarly to produce high temperature plasmas of any desired composition.

For self-sustaining or pulsed controlled thermonuclear reactors, a plasma density of above about $10^{14}$ particles to as high as at least $10^{16}$ particles/cc may be needed at temperature ranging from 5 keV to at least 100 keV. Laboratory plasmas, by contrast may range to at least as low as $10^{11}$ particles/cc and have temperatures ranging upward from a few electron volts.

EXAMPLE

Linear Proton E-Layer Controlled Thermonuclear Reactor Parameters (Pilot Plant or Laboratory Scale)

| | |
|---|---|
| Plasma fuel | tritium-deuterium |
| Final Plasma density (T–D) | $2\times10^{15}$ particles/cc |
| Final plasma temperature (nominal) | 10 keV |
| E-layer particles injected as 1–2 BeV | $H_2^+$ ions |
| Yielding (at 20% efficiency by Lorentz disassociation) | 1 MA H$^+$ ions |
| E-layer buildup time | 800–1600 seconds |
| External field | 100 K gauss |
| Mirror field | 110 K gauss |
| $\beta$ | 0.50 |
| E-layer length | 800 cm. |
| E-layer radius | 120 cm. |
| E-layer field reversal $\zeta$ (loading factor) | 1.6 |
| Background plasma density (H$^+$) | $10^{12}$ cc |
| Stored energy of E-layer | 800 megajoules |
| Plasma energy in containment zone | 13 megajoules |
| Collisional heating rate | 50 keV per plasma particles/sec. |
| Plasma lifetime> 200 Bohm | (200 m. sec. at 10 keV) |

Plasma temperature steady state ~ 10 keV with fusion ~ 20 keV for 100 $m$ sec. or more At a plasma density of 2 × 10$^{15}$ particles/cc Proton E-layer energy loss to plasma in/sec = 16 percent Proton scattering loss = 40 percent A controlled thermonuclear reactor such as the foregoing produces a large thermal power output as well as a large quantity of energetic neutrons, i.e., 14 MeV neutrons from the D—D and T–D reactions as well as resulting in the production of other energetic charged particles such as He$_4^+$. These latter charged particles can provide the energy for maintaining the fusion reaction temperature. In the TD reaction, for example, 80 percent of the output power is in the form of 14 MeV neutrons and 20 percent in the form of He4+. In a pulsed operation the large thermal power pulses as well as the great pulse of heated plasma which may be produced could be destructive to the vessel 11. Accordingly, a heat shield vacuum wall 56 of aluminum, refractory metal or the like disposed in spaced relation to vessel 11, and situated between the vessel wall and the plasma may be used to intercept the energy produced in the reaction and reradiate the energy at a slower rate to the vessel walls. Alternatively, the heat shield can be provided with coolant means (not shown). For recovering or dissipating the heat from the vessel side wall there may be provided a cylindrical shell 57 circumjacent the cylindrical vessel wall portion defining a chamber 58 through which a coolant or heat exchange medium may be passed by means (not shown). The discharged coolant can, of course, be utilized in an external heat exchanger (not shown) to supply thermal power to energy power generating or other utilization equipment (not shown).

Furthermore a second chamber 59 may be defined circumjacent shell 57 by providing a shell 60 for the disposition of a blanket material therein to react with 14 MeV neutrons emerging from the plasma in the reactor vessel 11. For example a breeder blanket comprising a moderating neutron multiplying fertile breeder material 61 such as lithium fluoride may be disposed or circulated therethrough to produce tritium which can be recovered and recycled as a fuel in reactor 10. Such a blanket material i.e., lithium fluoride is intensely corrosive and may become heated, e.g., to about 1,000° C. as a result of moderating and reacting with the neutrons wherefore the chamber 59 should be defined by vessel walls constructed of niobium or other corrosion resistant refractory material suitable or use in an intense neutron flux. Cooling coils (not shown) may be used therein to remove heat from material 61 or the molten material 61 may be circulated to heat exchangers (not shown) exterior to vessel 11 to furnish heat for power generation. In the event that the magnet coil is a superconductor or other conductor which is susceptible to damage by neutron irradiation an annular closed chamber 64, between shells 60 and 62 containing a neutron absorber, such as borated water is disposed as a magnet shield between the breeder blanket and the coil 19. Thermal insulation (not shown) may generally be disposed as a layer within shell 60, shell 62 which in this case would be constituted of spaced wall members with insulation therebetween. A containment vessel 67 may be provided outwardly of coils 19, 21 and 21' while a biological shield (not shown) may be provided exteriorly of vessel 67. Thermal insulation (not shown) may be disposed between coils 19, 21 and 21' and the walls of containment vessel 67, especially if a superconductor or cryogenic coil system is employed.

What I claim is:

1. In a process wherein a high temperature plasma is produced and confined in a magnetic containment zone field pattern created by the interaction of the magnetic field of a cylindrical layer of energetic charged particles rotating in the uniform intensity region of a magnetic mirror field produced in an evacuated chamber, the steps comprising:
    a. establishing a magnetic mirror field in said chamber, said mirror field comprising an elongated axially symmetric magnetic field having a linear central region of substantially uniform intensity positioned between end regions of increased magnetic field intensity;
    b. directing a beam of high energy light nuclide molecular ions into said uniform intensity magnetic field region at a slight angle to a plane perpendicular to the axis of said field and tangent to a circle concentric therewith and dissociating and ionizing the molecular ions to produce relativistic positively charged light nuclide ions which then form a generally cylindrical E-layer rotating about the axis in the central linear region of said magnetic field, wherein the magnetic field of said E-layer interacts with the axially symmetric field to produce a system partially, at least, of closed magnetic field lines defining a magnetic potential well containment zone for charged particles; and
    c. introducing a fuel material into said containment zone to be ionized and heated by interaction with the energetic ions of said E-layer to form a high temperature plasma confined in said containment zone.

2. A process as defined in claim 1 wherein said positively charged light nuclide ions comprise a material selected from the group consisting of $H^+$, $D^+$, $T^+$, $He_3^+$ and $He_4^+$, and said E-layer has an aspect ratio in the range of about 1:1 to about 5:1 length to diameter.

3. A process as defined in claim 2 wherein said molecular ions are a material selected from the group consisting of $H_2^+$, $D_2^+$, $TD^+$ and $T_2^+$, wherein the relativistic light nuclide ions are selected from the group consisting of $H^+$, $D^+$, and $T^+$ and said light nuclide ions have an energy above about 50 MeV.

4. A process as defined in claim 3 wherein said fuel material comprises an electrically neutral form of material including a fusionable light nuclide element and the plasma produced is a controlled fusion plasma.

5. A process as defined in claim 4 wherein said central magnetic field region has an intensity in the range of about 50 kilogauss to about 250 kilogauss, wherein said molecular ions have an energy of above about 1 BeV, and said E-layer produces a magnetic potential well ($\Delta B/B$) which has a depth of at least about 0.25 for equivalent electron-ion temperatures in the plasma.

6. Apparatus for producing a high temperature plasma comprising:
    a. means including an elongated generally cylindrical vessel defining an evacuated chamber;
    b. means including a solenoidal coil having a central region of substantially uniform ampere turns distribution and terminal regions of increased ampere turns distribution disposed about said vessel to produce an axially symmetric magnetic mirror field having a central region of uniform field intensity bounded by end regions of intensified magnetic field strength in said chamber;
    c. means for directing a beam of high energy light nuclide molecular ions tangent to a circle coaxially disposed within the uniform intensity magnetic field region and at a slight angle to a plane perpendicular to the field axis in said chamber including means operable within said magnetic field to dissociate said molecular ions to produce high energy positively charged ions having a charge to mass ratio higher than those in the initial particle beam which are then trapped in the magnetic field to produce a generally cylindrical positive ion E-layer rotating about the axis in the central linear portion of said magnetic field with the magnetic field of said E-layer interacting with the axially symmetric magnetic field to produce a system including closed magnetic field lines defining a magnetic potential well charged particle containment zone; and
    d. means for introducing a fuel material into said containment zone to be ionized and heated by interaction with the high energy charged particles of the E-layer to produce a high temperature plasma confined in said containment zone.

7. Apparatus as defined in claim 6, wherein said molecular ions are dissociable to produce high energy ions selected from the group consisting of $H^+$, $D^+$, $T^+$, $He_3^+$ and $He_4^+$ to form said E-layer and wherein said fuel material includes at least one fusionable light nuclide component so that a plasma including fusionable ions is produced and confined in said containment zone.

8. Apparatus as defined in claim 7 wherein said high energy ions have an energy of at least about 50 MeV.

9. Apparatus as defined in claim 8 wherein said magnetic field has an intensity of at least about 150 kilogauss in the region whereat said molecular ions are injected and therefore effecting dissociation thereof by a Lorentz force mechanism.

10. Apparatus as defined in claim 8 including means for providing a background gas atmosphere of sufficient density to provide a background plasma density of at least about $10^8$ particles per cc in said magnetic field providing said means for dissociating said high energy molecular ions.

11. Apparatus as defined in claim 8 wherein means are provided for introducing a light nuclide gas or vapor into the magnetic field region in said chamber whereat said beam of high energy molecular ions are injected to interact to dissociate said molecular ions to produce said positive ions which form said E-layer.

* * * * *